(12) United States Patent
Guerin et al.

(10) Patent No.: US 6,337,782 B1
(45) Date of Patent: Jan. 8, 2002

(54) TOP COVER HAVING A TURBO TUNNEL FOR AN AIR VANE LATCH APPARATUS IN A DISC DRIVE

(75) Inventors: Eric Martin Guerin, Loveland; Thomas M. Durrum, Broomfield; John A. Martindale, Thornton; Gary F. Kelsic, Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/472,500

(22) Filed: Dec. 27, 1999

Related U.S. Application Data
(60) Provisional application No. 60/130,303, filed on Apr. 21, 1999.

(51) Int. Cl.⁷ .......................... G11B 21/22; G11B 5/54; G11B 33/14
(52) U.S. Cl. .................. 360/256.1; 360/97.02
(58) Field of Search .............. 360/256.1, 256, 360/256.6, 254, 250, 240, 97.02, 97.01, 88, FOR 205

(56) References Cited

U.S. PATENT DOCUMENTS

| | | | |
|---|---|---|---|
| 4,647,997 A | * 3/1987 | Westwood | 360/256.1 |
| 4,692,829 A | 9/1987 | Campbell | 360/256.1 |
| 4,725,904 A | * 2/1988 | Dalziel | 360/78.13 |
| 5,036,416 A | 7/1991 | Mastache | 360/256.1 |
| 5,526,203 A | 6/1996 | Mohajerani et al. | 360/256.1 |
| 5,541,791 A | 7/1996 | Yamasaki et al. | 360/256.1 |
| 5,555,146 A | 9/1996 | Hickox et al. | 360/256.4 |
| 5,602,700 A | 2/1997 | Viskochil et al. | 360/256.1 |
| 5,668,683 A | 9/1997 | Stone | 360/256.1 |
| 5,715,118 A | 2/1998 | Tacklind | 360/256.1 |
| 5,717,544 A | 2/1998 | Michael | 360/256.1 |
| 5,768,057 A | 6/1998 | Fernandes et al. | 360/97.02 |
| 5,768,058 A | * 6/1998 | Hofland | 360/256.1 |
| 5,859,751 A | 1/1999 | Tacklind | 360/256.1 |
| 5,907,453 A | * 5/1999 | Wood et al. | 360/97.02 |
| 5,956,203 A | * 9/1999 | Schirle et al. | 360/97.03 |

* cited by examiner

*Primary Examiner*—Hoa T. Nguyen
*Assistant Examiner*—Julie Anne Watko
(74) *Attorney, Agent, or Firm*—John B. Phillips; Merchant & Gould P.C.

(57) ABSTRACT

An apparatus for increasing the operative force on an air vane latch apparatus in a disc drive has a channel formed in the inside surface of the side wall of the head disc assembly cover immediately upstream of the air filter portion of the air vane latch apparatus for redirecting disc generated air flow against an air vane latch air filter and filter support bracket thus increasing the wind force on the air vane latch during disc drive operation to reduce the disc speed at which the latch apparatus moves from a latched position to an unlatched position.

19 Claims, 4 Drawing Sheets

TOP COVER HAVING A TURBO TUNNEL FOR AN AIR VANE LATCH APPARATUS IN A DISC DRIVE

RELATED APPLICATIONS

This application claims the benefit of priority of United States Provisional Patent Application Ser. No. 60/130,303 entitled "COVER, LIMITOR COVER TT, HILO", filed Apr. 21, 1999.

FIELD OF THE INVENTION

This application relates to magnetic disc drives and more particularly to an apparatus for latching a disc drive actuator mechanism in a parked position when the drive is deenergized and unlatching the actuator mechanism when the drive is energized.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

When the drive is de-energized or shut down, the drive motor stops spinning and the actuator is rotated, for example counterclockwise, to position the heads at an inner radius landing zone location and "park" or latch the actuator in this position. Often a magnetic latch is used to maintain the actuator in this position with the heads "parked" in the landing zone. When a magnetic latch is used, an inadvertent external shock load, such as the drive being dropped, may cause sufficient rotational force to be applied to the actuator arms to overcome the magnetic attraction and thus the actuator arm may rotate from the landing zone to the data region of the discs without the discs spinning at all. This could destroy the stored data on the disc and could destroy the heads themselves. Consequently there is a need for a latch mechanism that ensures that the actuator stays in the park position any time that the disc drive motor is de-energized and, more importantly, when the discs are not spinning.

This de-energized latching at low disc spin rates has been traditionally accomplished by a wind operated latching mechanism which utilizes wind generated by the spinning discs while the drive motor is energized to push against a pivoting air filter member positioned adjacent the outer margin of the discs. This air filter member has a pivot portion, an air filter portion, and an elongated air vane which extends outward over the top disc in the disc stack. The air vane is pushed against by the air drawn along the surface of the disc. At the other end of the pivot portion latching mechanism is an elongated latch arm for engaging the actuator and a tab portion which carries a steel ball therein. The steel ball in the tab portion is positioned in the magnetic field generated by the VCM magnets and thus biases the latch counterclockwise such that the latch arm interferes with movement of the actuator arm off of the magnetic latch when the drive is de-energized and the actuator arm arrives at the park position with the coilform of the VCM against the magnetic latch.

The operation of this conventional latch mechanism is completely automatic, driven only by the VCM magnet magnetic field bias when the discs are stopped, and the force exerted by wind against the air filter and air vane in opposition to the magnetic field bias when the discs are spinning at normal speed. The size and placement of the steel ball on the tab portion are dictated by the requirement that the latch be disengaged when the discs are operating at full speed and engaged when the discs are turning at less than full operating speed with the actuator arm moved into the parked position.

The conventional air vane design has worked well for drives with three or four or more operating discs in the head disc assembly (HDA). However, in the case of drives designed for four discs and having only one or two discs installed, there have been cases where the air vane latch failed to move to the disengaged position when the drive was energized, thus preventing actuator movement and appearing to the user by the software as a disc crash or disc drive failure. In these cases, the failures appear to have occurred at high altitudes such as above 5,000 feet. Accordingly, there is a need for a magnetic wind operated latching apparatus for use in disc drives having only one or two discs which automatically disengages the actuator arm when the disc drive motor spins the discs at operating speed and engages the actuator arm when the disc or discs spin at less than operating speed and the actuator arm is in the parked position in a head disc assembly (HDA) designed to accommodate up to four or more discs.

SUMMARY OF THE INVENTION

Against this backdrop the present invention has been developed. The present invention is a modified top cover an HDA which has an air vane air filter latch apparatus therein having an air vane adapted to extend over the upper surface of a top disc on the disc drive motor. The top cover has a channel formed along an inside side wall surface adjacent the air filter portion of the air vane air filter latch apparatus. This arrangement directs and focuses the flow of wind generated by a disc rotating within the HDA against the air filter support bracket portion of the air vane air filter latch apparatus to provide an additional force, i.e., moment arm, on the pivoting air filter and latch that becomes important when only one or two discs are located on the drive motor in the HDA. This channel improves the opening speed of the air vane and its position causes a high pressure region directly in front of the air filter and air filter bracket. This effectively increases the pressure differential across the air filter bracket causing a higher torque to be applied to the latch apparatus, which results in a lower opening speed, thus providing an additional margin for positive operation of the latch when the disc is rotating at normal rotational speed. This channel potentially also permits a larger steel ball to be utilized in the latch apparatus thereby ensuring more positive latch and unlatch operations of the apparatus.

These and various other features as well as advantages which characterize the present invention will be apparent from a reading of the following detailed description and a review of the associated drawings.

DETAILED DESCRIPTION

Figure 1:
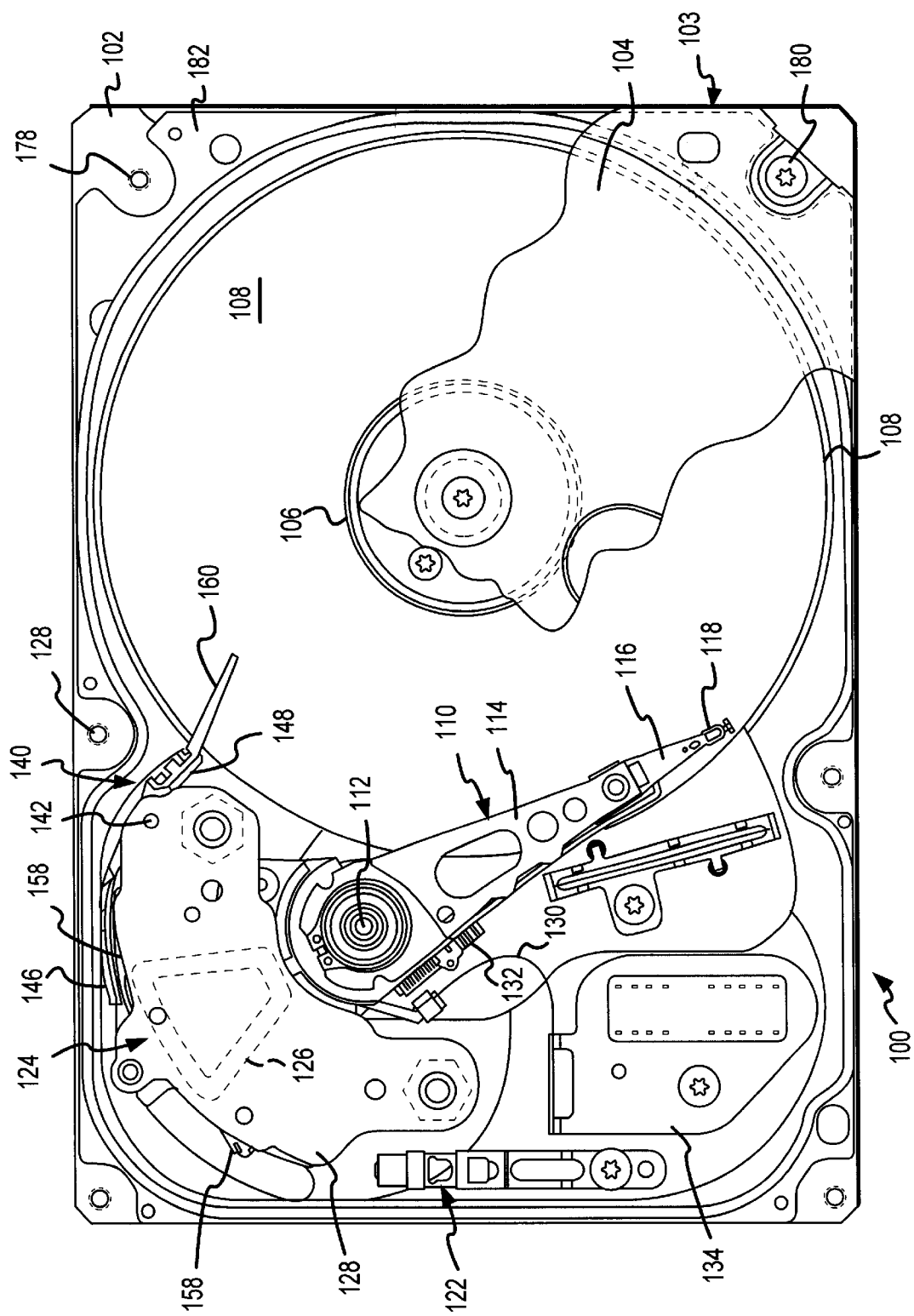
FIG. 1 is a plan view of a disc drive incorporating a top cover in accordance with a preferred embodiment of the invention with the head disc assembly (HDA) top cover partially removed.

A disc drive 100 constructed in accordance with a preferred embodiment of the present invention is shown in a plan view with portions broken away in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA) 101. The components include a spindle motor 106 that rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity adjacent the corresponding surface of the associated disc 108.

The spindle motor 106 is typically de-energized when the disc drive 100 is turned off or not in use for extended periods of time. The heads 118 are moved to park zones near the inner diameter of the discs 108 when the drive motor is de-energized. The heads 118 are secured in the park position through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets 120 on return plates 128 which are spaced apart. The magnets and return plates establish a vertical magnetic field between the magnets in which the coil 126 is immersed and suspended for rotation in a horizontal plane between the magnets. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a preamplifier printed circuit board 132 to which head wires (not shown) are connected; the head wires being routed along the actuator arms 114 and the flexures 116 to the heads 118. The preamplifier printed circuit board 132 typically includes circuitry for controlling the write currents applied to the heads 118 during a write operation and for amplifying read signals generated by the heads 118 during a read operation. The flex assembly 130 terminates at a flex bracket 134 for communication through the base plate 102 to a disc drive printed circuit board (not shown) mounted to the bottom side of the disc drive 100.

A pivoting air vane air filter and latch apparatus 140 is pivotally supported on a pin 142 projecting from the upper magnet return plates 128. The latch apparatus 140 is shown in FIG. 1 rotated clockwise to a disengaged position as would be the case when the drive 100 is at normal operation with the discs 108 rotating at normal speed.

Figure 3:
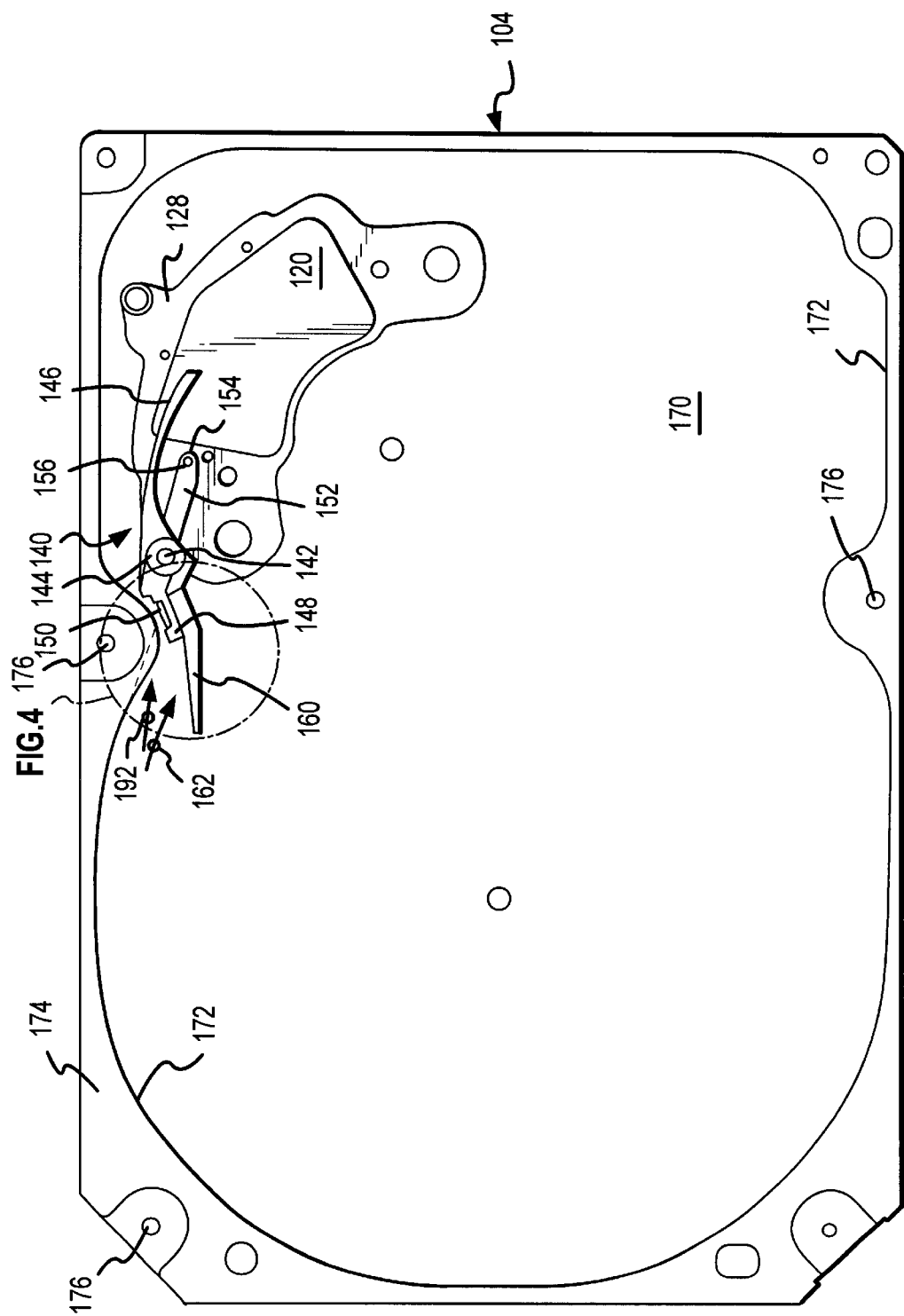
FIG. 3 is a plan view of the inside of the cover shown in FIG. 2 showing the air vane air filter latch apparatus and top plate of the voice coil motor magnet assembly located as it would appear when fully assembled in the disc drive.

In FIG. 3, the apparatus 140 is shown in greater detail. Here, the apparatus 140 is mounted on the upper return plate 128 which has been placed in the cavity of the cover 104 in a position as it would appear if viewed from inside the HDA, from the upper disc 108, when the HDA 101 is assembled together as a unit. FIGS. 1 and 3 may be viewed together to understand the structure and operation of the latch apparatus 140.

The latch apparatus 140 has a central pivot portion 144, a latch member 146 extending from one side of the central pivot portion 144, and an air filter bracket 148 extending from the other side of the central pivot portion 144. The filter bracket 148 forms an open rectangular frame support for a sheet of air filter media 150. A generally flat, tapered biasing arm member 152 extends from the central portion 144 so that its tip 154 extends into the magnetic field generated by the VCM magnets 120 when the apparatus is installed on the pivot pin 142. A steel ball 156 is mounted adjacent the tip 154 in the biasing arm 152. This ball 156 is in the magnetic field and is located on the biasing arm 152 a predetermined distance from the axis of the pivot portion 144.

The magnetic field of the VCM interacts with the ball 156 to provide a torque on the apparatus 140 in a counterclockwise direction, as viewed from the top as in FIG. 1. This bias is correspondingly clockwise in the view of FIG. 3. Thus the apparatus 140 is constantly biased toward engagement of the latch arm 146 with the actuator coil overmold 158 to prevent movement of the actuator assembly 110 off of the magnetic latch 122 when it is latched, i.e. in a parked position.

Extending laterally from the top of the air filter bracket 148 over the top disc 108 is an elongated air vane member 160. This air vane 160 generally acts as a "sail" in any wind generated by the disc 108 spinning on the spin motor 106. When the disc 108 spins, wind is generated by friction between the disc surface and the surrounding air. This wind is most pronounced adjacent the rim of the disc 108, hence the placement of the air filter bracket 148 and filter 150 adjacent the rim of the disc 108. The air vane member 160 extends over an outer portion of the upper surface of the disc 108 so as to catch the wind generated during operation of the disc drive 100. This wind, signified by the arrow 162 in FIG. 4, exerts a force on the air vane member 160 which counters the magnetic force exerted by the VCM magnets on the bias arm 152, and generally exceeds the bias torque when the disc 108 reaches operating speed in the drive 100 incorporating the present invention.

Figure 2:
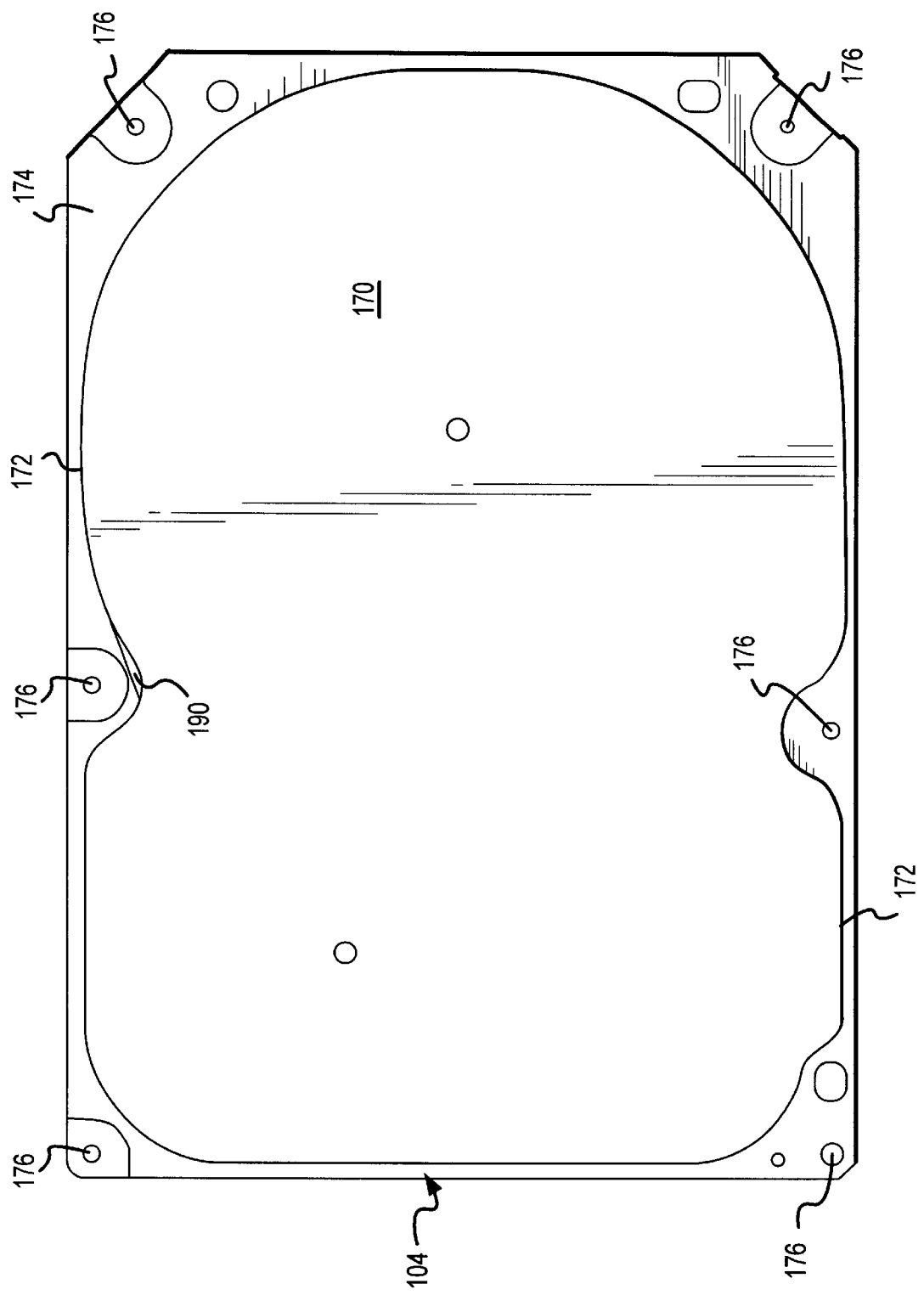
FIG. 2 is an outer plan view of a cover for the disc drive shown in FIG. 1.

Referring for a moment to FIGS. 2 and 3, the top cover 104 is shown in a top plan view and inside plan view respectively. The top cover 104 has a generally flat cover portion 170, a side wall portion 172 which generally extends at a right angle to the flat cover portion 170 and a peripheral flange portion 174 around the cover portion 170. The flange portion 174 extends outward generally parallel to the cover portion 170 and has six mounting holes 176 which are aligned to mate with corresponding threaded bores 178 in the base plate 102. These bores 178 receive screws 180 to fasten the top cover 104 and baseplate 102 together with a sealing gasket 182 sandwiched between the flange portion 174 and the baseplate 102.

The side wall 172 of the top cover 104 adjacent the mounting hole 176 located adjacent the air vane and air filter latch apparatus 140 has an indented channel 190 formed therein in accordance with the present invention. This indented channel 190 can be seen, outwardly projecting from the side wall 172 adjacent the upper middle hole 176 in the plan view of FIG. 2. In the underside plan views of FIGS. 3 and 4, the channel 190 is shown by the dashed line extending toward the air filter bracket 148. This portion of the view of FIG. 3 is enlarged in FIG. 4.

The top cover 104 is typically stamped from sheet metal. The channel 190 is preferably formed during the stamping process and extends parallel to the plane of rotation of the top disc 108 in the drive 100. Preferably, the channel 190 preferably has its longitudinal axis in the plane of the top disc 108 and extends generally tangential to the curvature of the side wall which is parallel to a tangent to the disc 108.

The channel 190 is an elongated channel directed toward the air filter 150 and the air filter support bracket 148. The cross sectional shape of the channel 190 is preferably arcuate or "c" shaped although a V shape or any other shape may also be used so long as the longitudinal shape is generally straight and directs air flow along the channel 190 toward the air filter bracket 148 as is shown by the arrow 192 rather than along the curvature of the disc 108, which is indicated by the arrow 162 in FIG. 4.

In general, an object placed in a flowing fluid (the wind) experiences two types of drag forces: friction drag and pressure drag. The friction drag is a function of the surface area of the body in the direction of flow and the viscosity of the flowing fluid. The pressure drag is a function of the surface area of the object perpendicular to the flow direction and the pressure differential across the upstream and downstream ends of the object. For an air vane latch, the surface area of the air vane in the direction of flow is very small and hence the friction drag can be neglected. The total drag force then mainly consists of pressure drag. Thus, for a given air vane geometry the opening speed, i.e. the disc speed at which the latch opens, can be reduced by increasing the pressure differential across the air vane 160 and/or the air filter 150. The channel 190 increases the air flow directed against the air filter bracket 148, which has a larger surface area than the air vane 160. Refer to the direction of arrow 192. Consequently, the channel 190 produces increased pressure differential across the air filter 150 and air filter support bracket 148.

Figure 4:
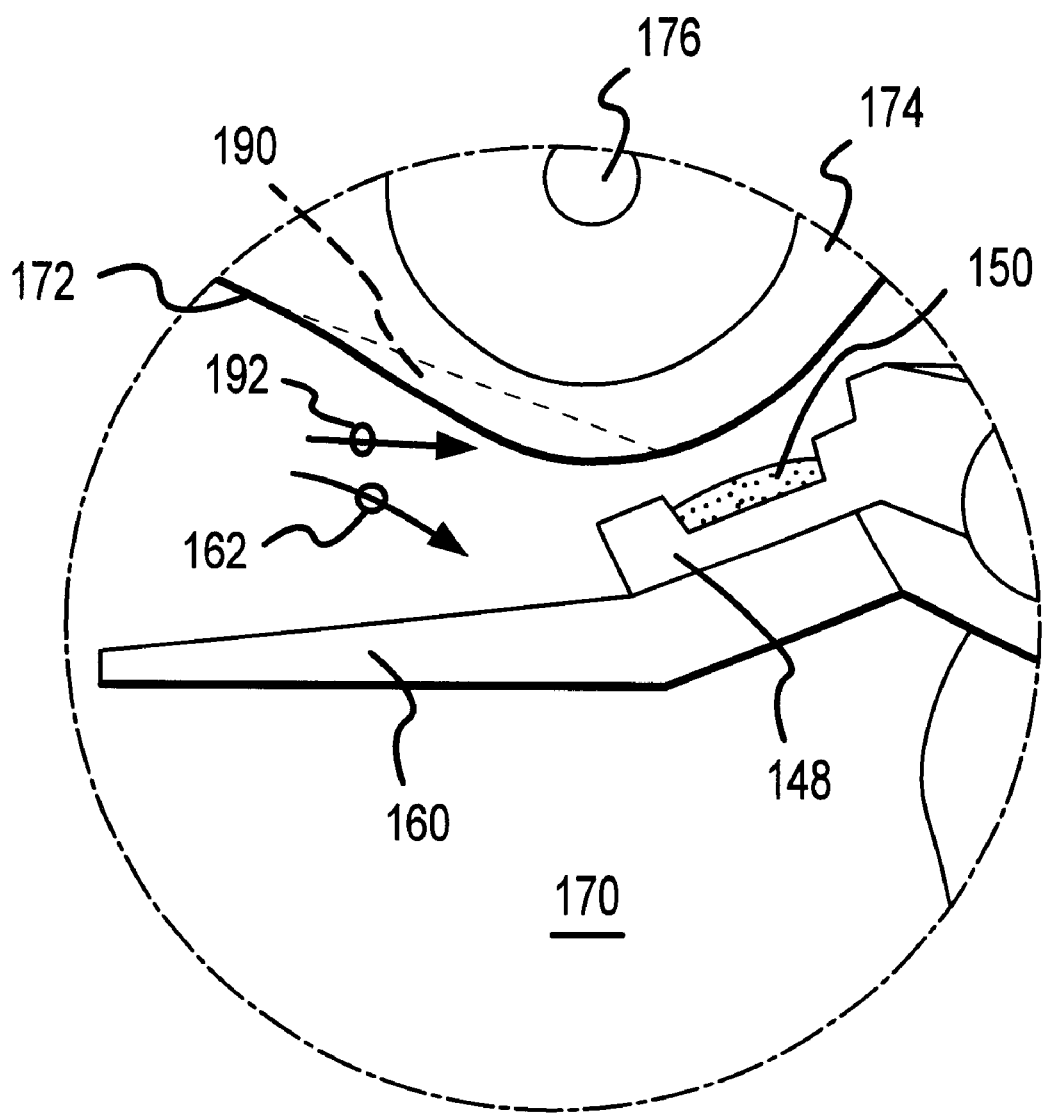
FIG. 4 is an enlarged view of the circled portion in FIG. 3.

Experimentally it has been determined that the optimal placement of the channel 190 is as shown in FIGS. 3 and 4. The length of the channel 190 is preferably between 0.25 inches and 0.50 inches with a preferred length of between about 0.3 to 0.4 inches. This configuration yields an opening of the air vane air filter latch apparatus 140 in a range of about 75 to 80 hertz compared to a normal operational opening speed of about 90 hertz. Stated another way, the presence of the channel 190 adjacent and in front of the air filter support bracket 148 lowers the speed at which the air vane and air filter latch apparatus 140 from about 90 hertz (5400 revolutions per minute) about 15 hertz, e.g., to around 76 hertz (4560 revolutions per minute). This lowering of opening speed essentially represents an increase in the rotational torque applied to the latch apparatus 140 up to and including at a normal operating speed of 90 hertz.

The preferred embodiment of the present invention may be summarized as a top cover (such as 104) for increasing torque applied to a wind operated air vane air filter and latch apparatus (such as 140) in a disc drive (such as 100). The drive has a base plate (such as 102), a spin motor (such as 106) mounted on the base plate (such as 102) rotatably carrying at least one disc (such as 108) thereon, an actuator assembly (such as 110) adjacent the at least one disc (such as 108) for positioning an actuator arm (such as 114) over a portion of the disc (such as 108), and a cover (such as 104) on the base plate (such as 102) covering the disc (such as 108), the spin motor (such as 106), and the actuator assembly (such as 110). The latch apparatus (such as 140) has a pivoting latch member (such as 146) extending from one side of a central pivot portion (such as 144), an air filter support bracket (such as 148) extending from another side of the central pivot portion (such as 144), and an air vane member (such as 160) extending from the air filter support bracket (such as 148) above a portion of the disc (such as 108).

The top cover (such as 104) includes a generally flat top portion (such as 170), a side wall portion (such as 172) extending generally at a right angle from the top portion (such as 170), and a flange portion (such as 174) extending outward from the side wall portion (such as 172) for fastening the top cover (such as 104) to the base plate (such as 102). The side wall portion (such as 172) has a channel (such as 190) formed therein for directing wind generated by a rotating disc (such as 108) against the air filter support bracket (such as 148). The channel (190) is formed in a portion of the side wall portion (such as 172) adjacent a mounting hole (such as 176) in the flange portion (such as 174) of the top cover (such as 104). The channel (such as 190) extends parallel to the plane of disc rotation. The channel (such as 190) preferably has a length between about 0.25 and 0.50 inches.

Stated another way, the present invention is a disc drive (such as 100) having at least one data storage disc (such as 108) rotatably mounted on a spin motor (such as 106)

fastened to a baseplate (such as 102), an actuator assembly (such as 110) mounted adjacent the data storage disc for rotating an actuator arm (such as 114) over a portion of the disc, and a cover (such as 104) on the baseplate (such as 102) enclosing the spin motor (such as 106), disc (such as 108) and actuator assembly (such as 110). The disc drive (such as 100) includes an air vane air filter and latch apparatus (such as 140) having a unitary body with a pivot portion (such as 144) rotatably mounted in the disc drive adjacent a disc (such as 108) on a stationary pivot pin (such as 142). The latch apparatus (such as 140) has a latch arm member (such as 146) extending from one side of the pivot portion (such as 144) toward the actuator assembly (such as 110) and an air filter bracket (such as 148) extending from another side of the pivot portion (such as 144) for holding an air filter (such as 150) in a path of wind generated by a disc (such as 108) rotating at a normal operating speed. The latch apparatus (such as 140) also has an air vane member (such as 160) extending from the bracket (such as 148). The air vane member (such as 160) preferably extends over a portion of the disc (such as 108). The top cover (such as 104) has an elongated channel (such as 190) formed in an inside side wall (such as 172) of the top cover (such as 104) adjacent the air filter bracket (such as 148) to redirect air flow generated by a spinning disc (such as 108) against the air filter bracket (such as 148) and air filter (such as 150) by an effective amount to reduce the disc spin speed at which the air vane air filter and latch apparatus (such as 140) moves to an unlatched position from a latched position. The channel (such as 190) extends along the inside side wall (such as 172) of the cover (such as 104) toward the air filter bracket (such as 148). The channel is spaced upstream of and in front of the air filter bracket (such as 148) so that the air flow concentrates on the air filter bracket to increase the wind generated torque on the pivoting portion (such as 144) of the latch apparatus (such as 140). The channel (such as 190) preferably has a length of between 0.25 and 0.50 inches.

Stated still another way, the present invention is a disc drive (such as 100) having one data storage disc (such as 108) rotatably mounted on a spin motor (such as 106) fastened to a baseplate (such as 102), an actuator assembly (such as 110) mounted adjacent the data storage disc (such as 108) for rotating an actuator arm (such as 114) over a portion of the disc, and a cover (such as 104) on the baseplate (such as 102) enclosing the spin motor, disc and actuator assembly in a head disc assembly (such as 101) in which the drive has an air vane air filter and latch apparatus (such as 140) having an air filter bracket portion (such as 148) pivotally positioned in a path of wind generated by the at least one disc (such as 108) rotating at a normal operating speed, and a channel means (such as 190) formed in an inside surface of a side wall (such as 172). The channel (such as 190) directs the disc generated wind against the air filter bracket (such as 148) to reduce the disc spin speed at which the air vane air filter and latch apparatus (such as 140) moves to an unlatched position from a latched position.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, this increased torque provided by the channel 190 potentially permits the size of the ball 156 to be increased, which increases the counter torque generated by the VCM magnets on the latch apparatus 140. Such an increase in ball size may be desirable in order for the latch apparatus 140 to more positively move between a latched and unlatched position. The channel 190 may be made by indenting the cover 104 to form the channel during cover formation or subsequent to cover formation. The channel 190 may have a curved cross section or may have a straight sided cross section, although an arcuate cross section is preferred. Accordingly, all such modifications, changes and alternatives are encompassed in the spirit of the invention disclosed and as defined in the appended claims.

What is claimed is:

1. A top cover for increasing torque applied to a wind operated latch apparatus in a disc drive having a base plate, a spin motor mounted on the base plate rotatably carrying at least one disc thereon, and an actuator assembly adjacent the at least one disc for positioning an actuator arm over a portion of the disc, wherein the latch apparatus has a pivoting latch member extending from one side of a central pivot portion, an air filter support bracket extending from another side of the central pivot portion, and an air vane member extending from the air filter support bracket above a portion of the disc, the top cover comprising:

a generally flat top portion, a side wall portion extending vertically downward from the top portion, and a flange portion extending laterally outward from a bottom end of the side wall portion for fastening the top cover to the base plate, the side wall portion having a channel formed therein for directing wind generated by the rotating disc against the air filter support bracket.

2. The top cover according to claim 1 wherein the channel is formed in a portion of the side wall portion adjacent a mounting hole in the flange portion of the top cover.

3. The top cover according to claim 1 wherein the channel is formed as an indent in the side wall portion.

4. The top cover according to claim 3 wherein the channel extends parallel to a plane of rotation of the disc.

5. The top cover according to claim 4 wherein the channel has a length between 0.25 and 0.50 inches.

6. The top cover according to claim 5 wherein the channel has an arcuate cross sectional shape.

7. The top cover according to claim 5 wherein the channel has an angular cross sectional shape.

8. The top cover according to claim 5 wherein:

the top cover is stamped from a sheet of metal; and the channel is formed during the stamping process.

9. The top cover according to claim 5 wherein the channel is vertically positioned along the side wall portion approximately midway between the flat top portion and the flange portion of the top cover.

10. A disc drive having at least one data storage disc rotatably mounted on a spin motor fastened to a baseplate, an actuator assembly mounted adjacent the data storage disc for rotating an actuator arm over a portion of the disc, and a cover on the baseplate enclosing the spin motor, disc and actuator assembly, the disc drive comprising:

an air vane air filter and latch apparatus having a unitary body with a pivot portion rotatably mounted in the disc drive adjacent the at least one disc on a stationary pivot pin, a latch arm member extending from one side of the pivot portion toward the actuator assembly, an air filter bracket extending from another side of the pivot portion for holding an air filter, and an air vane member extending from the bracket adapted to extend over a portion of the at least one disc; and an elongated channel formed in an inside side wall of the cover adjacent the air filter bracket to redirect air flow generated by a spinning disc away from the air vane member and toward the air filter bracket.

11. The disc drive according to claim 10 wherein the channel is formed as an indent in the inside side wall of the cover.

12. The disc drive according to claim 11 wherein the channel is spaced upstream of the air filter bracket.

13. The disc drive according to claim 12 wherein the channel has a length of between 0.25 and 0.50 inches.

14. The disc drive according to claim 11 wherein the channel has an arcuate cross sectional shape.

15. The disc drive according to claim 11 wherein the channel has an angular cross sectional shape.

16. The disc drive according to claim 11 wherein:

the cover is stamped from a sheet of metal; and the channel is formed during the stamping process.

17. The disc drive according to claim 11 wherein the channel is vertically positioned approximately midway along a height dimension of the inside side wall.

18. The disc drive according to claim 11 wherein the channel extends parallel to a plane of rotation of the at least one disc.

19. A disc drive having at least one data storage disc rotatably mounted on a spin motor fastened to a baseplate, an actuator assembly mounted adjacent the data storage disc for rotating an actuator arm over a portion of the disc, and a cover on the baseplate enclosing the spin motor, disc and actuator assembly, the disc drive comprising:

an air vane air filter and latch apparatus having an air filter bracket and an air vane member pivotally positioned in a path of wind generated by the at least one disc rotating at a normal operating speed, the air vane member extending from the air filter bracket over a portion of the at least one disc; and means for directing a portion of the disc generated wind away from the air vane member and toward the air filter bracket to reduce the disc spin speed at which the air vane air filter and latch apparatus moves to an unlatched position from a latched position.

* * * * *